Aug. 2, 1960

L. L. JOHNSON 2,947,568

MEANS FOR SUPPORTING STOCK FEED HOPPERS
AND THE LIKE ON PICKUP TRUCK BEDS

Filed Nov. 6, 1958

Lloyd L. Johnson
INVENTOR.

BY

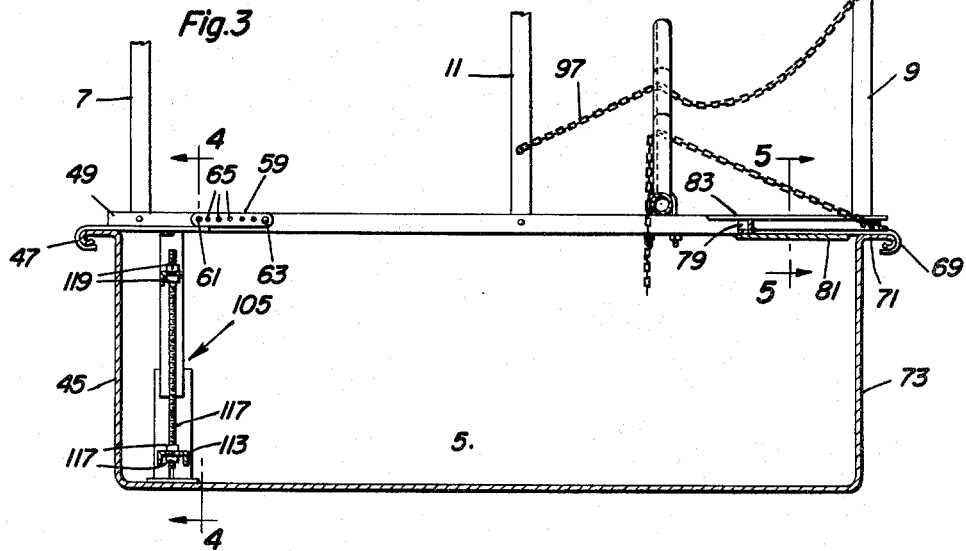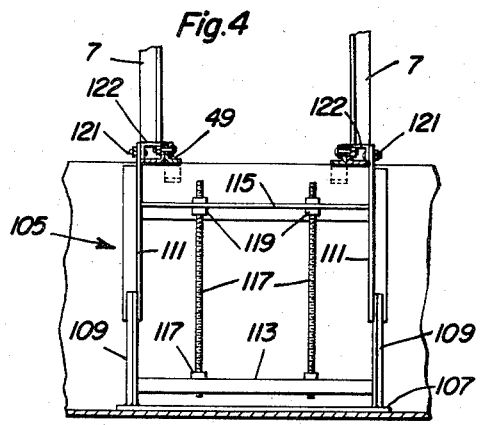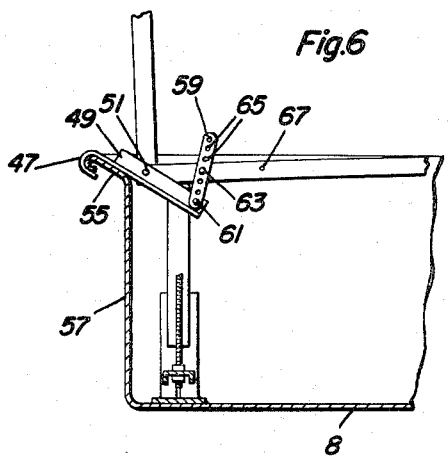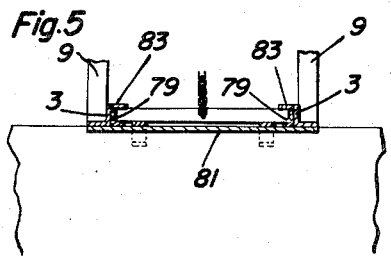
Lloyd L. Johnson
INVENTOR.

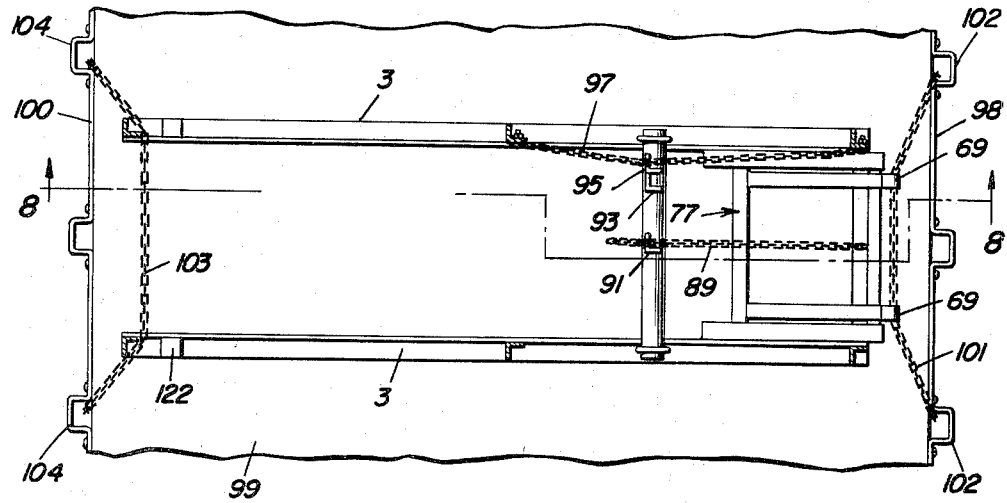
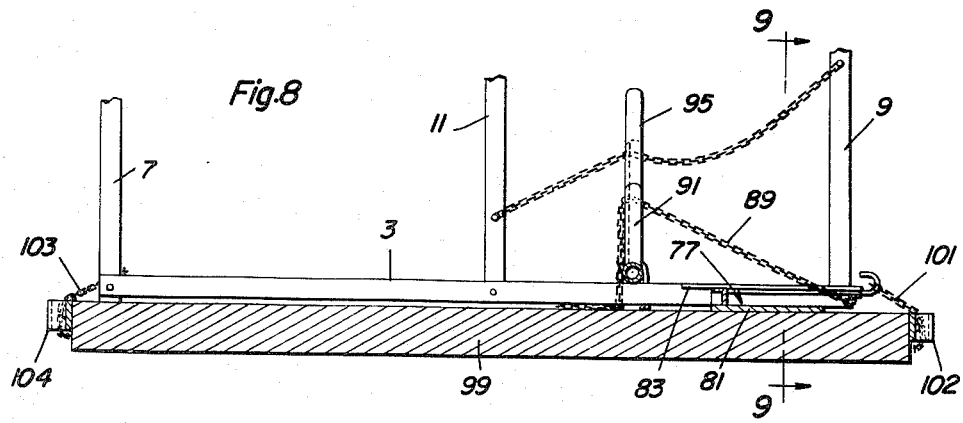
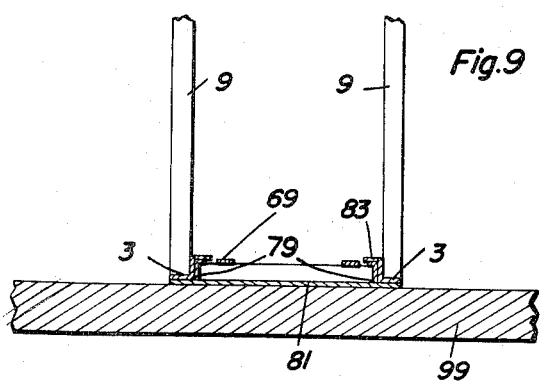
Lloyd L. Johnson
INVENTOR.

2,947,568

MEANS FOR SUPPORTING STOCK FEED HOPPERS AND THE LIKE ON PICKUP TRUCK BEDS

Lloyd L. Johnson, Rte. 3, Elmore City, Okla.

Filed Nov. 6, 1958, Ser. No. 772,371

5 Claims. (Cl. 296—35)

This invention relates to improvements in means for supporting stock feeder hoppers, or the like, on pickup truck beds for transporting by such trucks.

The primary object of the invention is to provide supporting means for the above purpose attachable easily and quickly to pickup truck beds of different widths having different types of sides and which will positively prevent shifting of the supported hopper longitudinally or transversely of such beds.

Another object is to provide supporting means according to the above which includes grapple hooks adapted to clampingly engage sides of said such truck beds in which the sides have either right angled outwardly projecting, or upwardly and outwardly sloping top edges.

Still another object is to provide supporting means for such hoppers, and the like, which is attachable to the stake sockets of conventional flat beds of pickup trucks.

Yet another object is to provide supporting means for the above purposes, which is strong, yet light in weight for easy handling, and comparatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary view in vertical section taken on the line 3—3 of Figure 2;

Figure 4 is a fragmentary view in vertical section taken on the line 4—4 of Figure 3;

Figure 5 is a fragmentary view in vertical section taken on the line 5—5 of Figure 3;

Figure 6 is a fragmentary view in vertical section illustrating the supporting means attached to the upwardly and outwardly sloping top edge of one side of a pickup truck bed;

Figure 7 is a fragmentary view in plan of a modified form of supporting means attachable to the stake sockets of a flat bed pickup truck;

Figure 8 is a fragmentary view in vertical section taken on the line 8—8 of Figure 7;

Figure 9 is a fragmentary view in vertical section taken on the line 9—9 of Figure 8.

Figure 1:
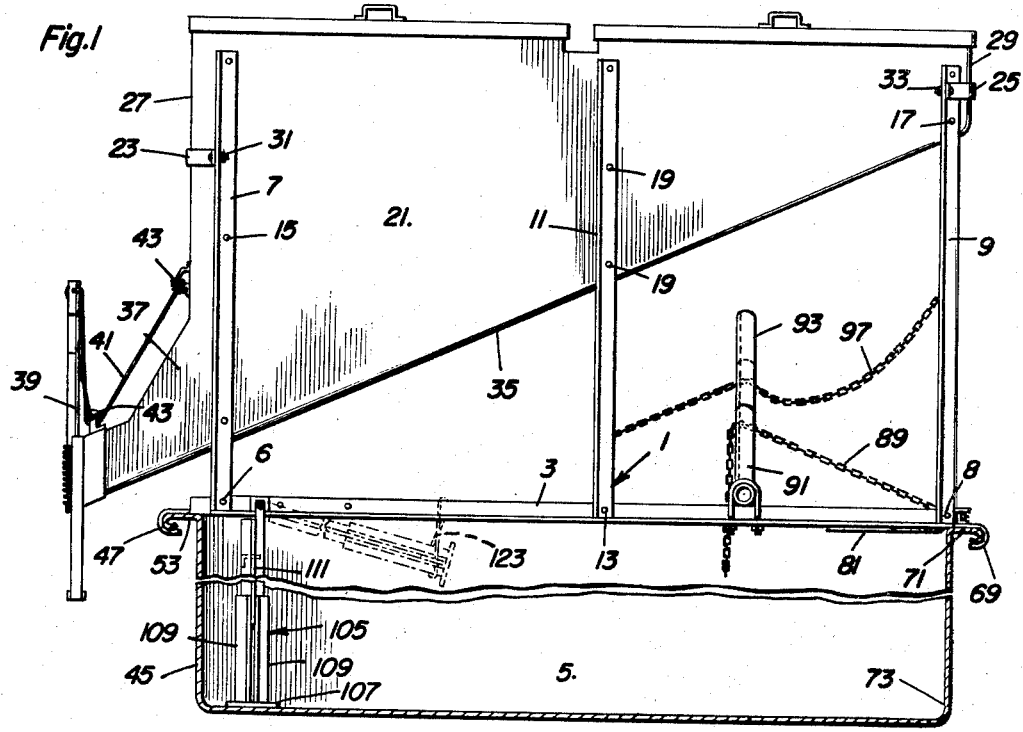
Figure 1 is a view partly in side elevation and partly in vertical section of the supporting means attached to a pickup truck bed having right angled outwardly projecting top edges, the bed being partly broken away.

Referring to the drawings by numerals, and first more particularly to Figures 1 to 5, 9 and 10, the supporting means of this invention comprises a hopper supporting frame 1 including a pair of base angle bars 3 spaced apart laterally and parallel and which are adapted to extend longitudinally across a truck pickup bed such as indicated at 5. Pairs of upright angle bars 7, 9 are riveted as at 6, 8 to corresponding ends of said base bars 3, and a pair of upright angle bars 11 are riveted as at 13, to said base bars 3 intermediate the ends of the base bars. The pairs of bars 7, 9, 11 are riveted as at 15, 17, 19 to opposite sides of a stock feeder hopper 21, or the like, to support said hopper 21 elevated in the frame 1. Crossbars 23, 25 connect the pairs of upright bars 7, 9 at opposite ends of the frame 1 and extend across front and rear ends 27, 29 of the hopper 21, said crossbars 23, 25 being riveted, as at 31, 33 to the bars 7, 9.

The hopper 21 is preferably of a type having a bottom 35 sloping downwardly to a discharge spout 37 on its front end 27 closed by a spring tensioned downwardly opening gate 39 operated by a pull cable 41 trained around pulleys 43, said hopper 21 forming the subject matter of my co-pending application Serial No. 731,976, filed April 30, 1958, and forms per se no part of this invention except as it may enter into combination with the supporting means.

Figure 2:
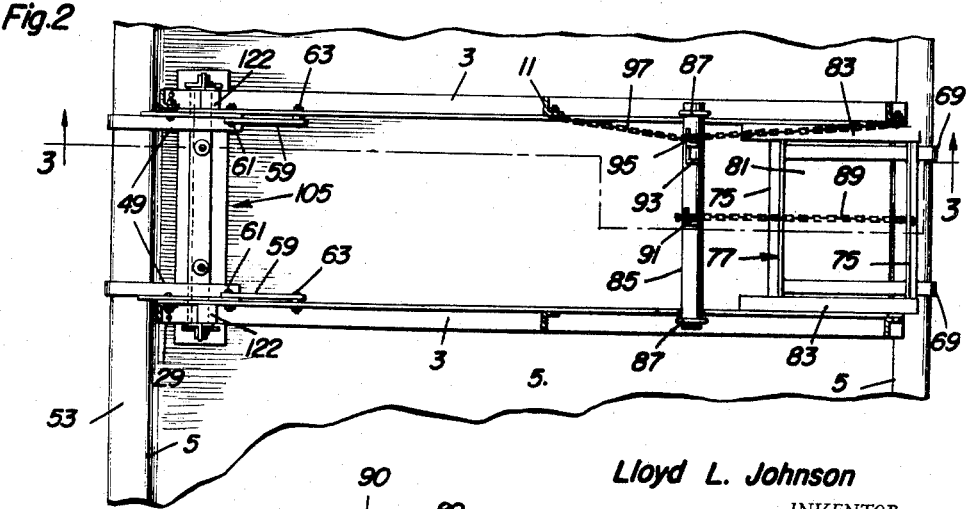
Figure 2 is a fragmentary plan view of the same with the hopper eliminated.
Figure 10:
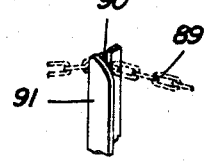
Figure 10 is a fragmentary view in perspective of detent means forming part of the supporting means.

Means is provided on corresponding ends of the base bars 3, adjacent the front end 27 of the hopper 21 for clampingly engaging one side of the truck bed 5 comprising a pair of downwardly opening, laterally spaced grapple hooks 47 extending outwardly of said ends and having straight shanks 49 pivoted, as at 51, intermediate their ends for swinging into horizontal position, parallel to the base bars 3, as shown in Figures 1 through 4, or, into upwardly and outwardly inclined positions as shown in Figure 6. When swung into horizontal position shanks 49 are positioned to lie flatly on the right angled outturned upper edges 53 of one side 45 of a box body pickup truck bed 5, as shown in Figures 1, 2 and 3, with the hooks 47 straddling said edge 53, whereas, when said shanks are swung into upwardly and outwardly inclined position, they will lie flatly on the upwardly and outwardly inclined upper edge 55 of one side 57 of a box body pickup truck bed 8, as shown in Figure 5.

A pair of links 59 are terminally pivoted as at 61 to tail ends of the shanks 49 and by means of which and pins 63 inserted selectively in longitudinally spaced holes 65 in said links and longitudinally spaced holes 67 in the base bars 3, said shanks 49 may be locked in horizontal, or different upwardly and outwardly inclined positions, as occasion may require.

At the other corresponding ends of the base bars 3 a pair of downwardly opening laterally spaced hooks 69 are provided for straddling of the right angled outturned upper edges 71 of the other side 73 of the box body bed 5 and lying flatly on said edge 71, or, the upwardly and outwardly inclined upper edge of the other side, not shown, of the box body 8.

The pair of hooks 69 are suitably fixed to the bottoms of crossbars 75 of a frame 77 having side bars 79 parallel with and between the base bars 3. The frame 77 is slidably mounted on a plate 81 suitably fixed to the base bars 3 so that said frame is slidable inwardly and outwardly of the base bars 3, which is to say the frame 1, beneath hold-down ledges 83 on said base bars 3. The frame 77 is slidable manually outwardly for applying the hooks 47, 69 and inwardly to clampingly engage said hooks 47, 69 with the beforementioned upper edges 53, 71 on the one hand, or, the edges 55 one of which is shown. Also, the frame 77 is slidable outwardly for removal and replacing in inverted position to invert the hooks 69, for a purpose presently seen.

For sliding the slidable frame 77 inwardly the following means is provided. A transverse rock shaft 85 on the base bars 3 is journaled in U-bolts 87 in said bars 3. A pull chain 89 is terminally suitably connected to one of the crossbars 75 of the frame 77 and is detachably engaged in a notch 90 in an upstanding lever arm 91 on said cross shaft so that by rocking of said shaft 85 in one direction the frame 77 will be pulled inwardly. The chain 89 is detachable from the lever arm 91 so that the frame 77 can be removed and inverted. A hand lever 91 rises from the shaft 85 for rocking of said shaft.

A detent lever 95 like the lever 91 rises from the shaft for connection to a detent chain 97 terminally attached suitably to one of the end uprights 9 and to one of the center uprights 11, and whereby means is provided for holding the lever arm in a swung position in which the slidably mounted frame is moved inwardly into a selected position.

Referring now to Figures 7 to 9, as shown therein, the frame 77 has been removed and replaced in inverted position to arrange the hooks 69 in upturned position so that the base bars 3 of the frame 1 may be seated flat on a pickup truck flat bed 99. In this form of the invention, the hooks 49 are removed. The frame 1 is secured to the bed 99 by a pair of chains 101, 103. The chain 101 is suitably looped through a pair of stake sockets 102 on one side 98 of the bed 99 and through the upturned hooks 69. The chain 103 is looped through a pair of stake sockets 104 at the other side 100 of the bed 99 and looped around the end uprights 7 at corresponding ends of the base bars 3 which are adjacent said side 100. As will be understood, the slidable frame 77 is pulled inwardly of the base bars 3, as described in the foregoing and by the means previously described to tighten the chains 101, 103.

As will now be seen the hooks 47, 69 in the form of the invention shown in Figures 1 to 6 and 10 are adapted to be tightened against the sides of box body pickup trucks whereas, in the form of the invention shown in Figures 7 to 9, the chains 101, 103 are adapted to be tightened against the sides of flat pickup truck beds all by inward movement of the slidably mounted frame 77.

A jacking frame 105 is provided for detachably attaching to the base bars 3 at the ends thereof having the pivoted shank hooks 49 thereon for propping up the supporting frame 1 where the heaviest load is imposed thereon because of the chute 37, door 39 and parts associated with the door. This jack frame 105 comprises as shown, a base bar 107, a pair of lower spaced apart upright angle bars 109 on each end of the base bar 107, a pair of T iron upper bars 111 slidable vertically between the pairs of angle bars 109, a crossbar 113 connecting the pairs of lower bars 109, a cross 115 connecting the upper bars 111, and threaded shafts 117 slidably extended through said crossbars 113, 115 with nuts 117, 119 thereon arranged so that by turning the nuts on the shafts 117, the frame 105 may be extended or contracted as desired. The upper bars 111 are detachably bolted, as at 121, to flanges 122 on the base bars 3 for swinging of the jacking frame downwardly into jacking position to support the supporting frame 1 as shown in full lines in Figures 1, 2, 3 and 4, and to be swung upwardly into an out of the way position, as shown in broken lines in Figure 1, and held in upswung position by a tie cord 123 suitably fixed to the jacking frame 105 and to one of the base bars 3. When the supporting frame 1 is used on the flat bed 99, the jacking frame 105 is detached.

The foregoing will, it is believed, suffice to impart a clear understanding of this invention since the use and operation thereof have been described in conjunction with the description of parts.

However, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a hopper having sides, a supporting frame for said hopper comprising a pair of parallel laterally spaced base bars opposite each other and adapted to extend across a body of a pickup truck to support said hopper on said body with ends of the base bars adjacent opposite sides of the body, and means for fastening the base bars to the sides of a pickup truck body comprising fasteners on said bars for securing to one side of said body a frame having fasteners thereon for securing to the other side of said body and being slidably mounted on and between said base bars for movement to tightly secure all of said fasteners, a transverse shaft journaled on said bars for rotation thereon, operating connectors between said shaft and slidably mounted frame for sliding the slidably mounted frame in response to rotation of said shaft in one direction, a hand lever on said shaft swingable to rotate the shaft, and detent means for releasably holding the hand lever in swung position.

2. The combination of claim 1, said fasteners comprising hooks on corresponding ends of said base bars and hooks on said slidably mounted frame for overlying and clampingly engaging the upper edges of the sides of a pickup truck body, said hooks clampingly engaging said upper edges in response to sliding of said slidable frame.

3. The combination of claim 1, said operating connections between said shaft and slidably mounted frame comprising an upstanding lever arm on said shaft and a flexible pull member connected to said lever arm and slidably mounted frame.

4. The combination of claim 1, said detent means comprising a detent lever on said shaft swingable thereon and a chain on said supporting frame engageable with said detent lever to prevent said detent lever from swinging.

5. The combination of claim 1, said fasteners comprising a flexible member attached to said base frame and attachable to stake sockets on one side of said body, hooks on said slidably mounted frame, and another flexible member attachable to stake sockets on the other side of said body and looped through said hooks.

References Cited in the file of this patent

UNITED STATES PATENTS

| | | |
|---|---|---|
| 1,602,146 | Callison | Oct. 5, 1926 |
| 2,117,068 | Ludington | May 10, 1938 |
| 2,675,947 | Wynn | Apr. 20, 1954 |